United States Patent
Dunas et al.

(10) Patent No.: US 7,391,363 B2
(45) Date of Patent: Jun. 24, 2008

(54) SYSTEM AND METHOD FOR AUGMENTATION OF SATELLITE POSITIONING SYSTEMS

(75) Inventors: Etienne Dunas, Toulouse (FR); Philippe Roghi, Cugnaux (FR)

(73) Assignee: Alcatel, Paris (FR)

( * ) Notice: Subject to any disclaimer, the term of this patent is extended or adjusted under 35 U.S.C. 154(b) by 294 days.

(21) Appl. No.: 10/510,690

(22) PCT Filed: Apr. 12, 2002

(86) PCT No.: PCT/EP02/10544

§ 371 (c)(1),
(2), (4) Date: Feb. 16, 2005

(87) PCT Pub. No.: WO03/087870

PCT Pub. Date: Apr. 23, 2003

(65) Prior Publication Data

US 2005/0122260 A1    Jun. 9, 2005

(51) Int. Cl.
*G01S 1/00* (2006.01)
(52) U.S. Cl. .............. 342/357.02; 342/357.03; 342/357.09; 342/358
(58) Field of Classification Search ............ 342/357.02, 342/357.03, 357.06, 357.09, 358; 701/213–215
See application file for complete search history.

(56) References Cited

U.S. PATENT DOCUMENTS

| | | | |
|---|---|---|---|
| 4,660,196 A * | 4/1987 | Gray et al. ................. | 370/326 |
| 5,467,282 A | 11/1995 | Dennis | |
| 5,583,562 A * | 12/1996 | Birch et al. ................ | 725/151 |
| 5,923,642 A * | 7/1999 | Young ........................ | 370/206 |
| 6,040,798 A | 3/2000 | Kinal | |
| 7,096,201 B2 * | 8/2006 | Yamanaka .................. | 705/50 |
| 2002/0118608 A1 * | 8/2002 | Oishi ........................... | 369/1 |
| 2004/0072575 A1 * | 4/2004 | Young et al. ............. | 455/456.1 |

OTHER PUBLICATIONS

G. Kinal et al, Inmarsat integrity channels for global navigation satellite systems, Proceedings of the National Telesystems Conference (NTC). Washington, May 19-20, 1992, NY, IEEE, US May 19, 1992, pp. 3-5 through 3-8.

* cited by examiner

*Primary Examiner*—Dao Phan
(74) *Attorney, Agent, or Firm*—Sughrue Mion, PLLC

(57) ABSTRACT

A system and a method for augmentation of satellite positioning systems wherein a monitoring ground station (MGS) is connected to a computer center in charge of determining the level of error of a satellite (NS) broadcasting positioning signals, and transmitting navigation correction data to a mobile user. The transmission is performed using a digital satellite system using at least one digital satellite (DS) capable of broadcasting multiplexed data in down-link transmission to a user station (U). The user station (U) de-multiplexes and retrieves the navigation correction data from said digital satellite down-link transmission by way of a frame adapter (7) connected to a satellite receiver (6). Specific data such as time or GNSS almanacs are replicated under specific format and put into specific parts of a signaling channel to enable time broadcast to standard receivers of a DS system, and to speed-up acquisition of GNSS satellite signal by standard GNSS receivers possibly in use in the U station. A method is also disclosed for broadcasting time with a reasonable accuracy.

23 Claims, 3 Drawing Sheets

SYSTEM AND METHOD FOR AUGMENTATION OF SATELLITE POSITIONING SYSTEMS

The present invention relates to a system and a method for augmentation of satellite positioning systems, said augmentation being carried out using navigation corrections which are broadcast through a digital satellite broadcasting system. More particularly the invention proposes that correction data for augmentation of satellite positioning systems be transmitted using a part of a signaling channel related to a channel used for broadcasting by a digital satellite such as for example a digital direct broadcasting satellite (DDBS) system such as a digital audio broadcasting system. The invention is in particular applicable, but not limited to, wide spread remote sensing systems such as Navigation or Positioning Satellite Based Augmentation Systems which are typically in charge of determining specific features of the satellites parts of a satellite positioning system. As it is discussed in further detail below, by means of the solution proposed by the present invention, the need for using specific on-board satellite transponders is eliminated and sharing of data transmission is made possible which gives rise to overall cost reduction. The use of a portion of a signaling channel associated or embedded within a commercial channel broadcast from a digital satellite system, usually left free as it is quite often reserved for future or auxiliary data uses, reduces drastically the cost to substantially negligible levels and enhances substantially the geographical availability of the correction data transfer in the current satellite positioning systems such as the US system known as Global Positioning System (GPS) or the Russian system known as Global Satellite Navigation System (GLONASS), or it may be applicable to other systems to be implemented in the future such as the European "Galileo" system. Generally, these systems are referred to as Global Navigational Satellite Systems (GNSS).

Moreover, since those navigation correction data carry very accurate time information, the solution proposed by the invention also includes the feature of providing time to DDBS system receivers themselves, thus enabling reasonably accurate time to be broadcast by conventional and low-cost receivers adapted for use with the DDBS systems. As the navigation correction data also contains GNSS predicted fleet almanacs, it can also be used to simplify or speed-up GNSS satellite acquisition procedure when starting from scratch. Almanacs are a set of parameters which allow each GNSS receiver to determine the trajectories and the clock errors of the respective GNSS satellites which it uses. The almanacs of all of the active GNSS satellites are broadcast by each GNSS satellite and are updated each week.

BACKGROUND OF THE INVENTION

In a known GNSS there are typically a plurality of satellites which broadcast positioning signals, said signals being timed using highly accurate clocks aboard the satellites where all the clocks of the satellites pertaining to a specific constellation are accurately synchronized.

The basic idea underlying such positioning systems is that a mobile user on or close to earth (such as an automobile or an aircraft) with respect to GNSS satellite orbit altitude, capable of receiving directly or indirectly through any kind of retransmission of said signals can thus determine its position by an accurate measurement of the time a signal has taken to travel from the a given satellite to its receiver, assuming that the location of the satellite is determined, which is the case in practice. Usually the mobile user receives signals from a group of satellites in order determine its exact coordinates and local time.

The signals received from the satellites may be subject to inaccuracies which are undesirable in a global positioning system. Some of the most commonly known inaccuracies, or errors, in the satellite signals are caused by the so-called ionospheric and tropospheric delays due to relatively rapid variations in the status of these atmospheric layers. Another error is the so-called ephemeris error which is the difference between the data indicating a satellite's real location and the data on the location it is expected to be according to calculations, a similar may be caused in relation to the real and calculated timing of the satellite. Another error is caused by multipath propagation of the signal. Finally there may be errors introduced deliberately by government authorities in the data transmitted by the satellite for security considerations.

As these errors can adversely affect the accuracy, integrity, continuity and availability of the global positioning systems, their elimination or at least their reduction to practically desirable levels has become a need. Various solutions have been proposed for overcoming such drawbacks.

According to a known solution, a monitoring ground station is used to determine the level of error of the satellites transmitting positioning signals. In order to determine the error, said monitoring ground station is required to be in an accurately known position. The monitoring ground station receives signals broadcast from positioning satellites which enable it to determine its position. This data is then compared at one or more navigation computing centers to the real position of the monitoring ground station and by such comparison the level of error is determined. This information, combined with information coming from other monitoring ground stations, is indicative of the amount of the correction needed to be applied to a given satellite signal. The resulting navigation correction data is then transmitted to the mobile user, together with a guaranteed level of reliability and confidence (integrity information) which may be expressed in a so called uncertainty radius for the three-dimensional position of the mobile user, as well as for the time and status of the GNSS satellite fleet. One known difficulty is that acquiring all satellite data needed to compute a navigation solution which would enable the determination of a precise location and time requires acquiring GNSS satellite fleet predicted position through the so-called GNSS almanacs which are sent at relatively low rate, thus causing a receiving position to need significant time such as typically 15 min to start evaluating mobile position. In case of a wide area application, the correction information is sent to a geo-stationary satellite and through the latter it is broadcast to all mobile users under its coverage. Often the geo-stationary satellite is also used for transmitting a signal that appears as it were directly coming from a GNSS satellite, thus adding more capability in locations where GNSS coverage is poor.

This solution typically requires that each satellite used for this purpose have a navigation specific payload comprising at least a transponder integrated therein. This requirement is costly and furthermore, its implementation would be limited by the payload capacity of the satellite. On the other hand, a number of applications exist where using a channel not pretending to look like a GNSS satellite channel may still be of interest.

Satellite based augmentation systems presently known, such as the European Geo-stationary Navigation Overlay Service (EGNOS) and Wide Area Augmentation System (WMS) use transponders in the L-Band. This band is in turn comprised of two frequency spectrums currently in use, namely the L1 band of 1575.42 MHz and the L2 band of 1227.6 MHz although the use of other frequencies are presently under development. The transponders are on-board specific satellites such a for example the INMARSAT communication satellites or the European Space Agency ARTEMIS experimental satellite. The navigation correction signals are sent to these specific satellites which provide a link to the user using said transponders. The signal timing is based on bursts of 1 Hz messages; however, the available bit rate in these messages, when said messages are compliant with the standard DO-229 is 500 bps only. This is a relatively slow rate giving rise to the fact that messages arrive too late to the destination. In fact, the total message of a computer center used in such augmentation systems has an actual user bit rate of 250 bits/sec, since half of the 500 bps are used for forward error correction due to the fact that the transmission needs very low bit error rate (BER), and that conventional navigation payloads do not have specific mechanisms to ensure it.

It is therefore desired to broadcast data relative to the correction of errors in navigation signals to a mobile user in a less costly manner, also maintaining the payload on-board a satellite as low as possible, while at the same time such data is transmitted at a higher speed. It is also be desired to improve redundancy at the user side by simultaneously broadcasting data computed in parallel by more than one computer center.

DESCRIPTION OF THE INVENTION

The above drawbacks are overcome and the objective is reached by using the solution proposed by the present invention according to which use is made of multiplexing features, as well as very low bit error rate and relatively high capacity for transmitting auto-synchronous data of a digital satellite system. One example of such systems is a direct digital satellite broadcasting system used for broadcasting digital audio. Using these satellite systems, it is possible to broadcast the data related to the correction of navigation over a wide region, where the mobile users are located, taking benefit of low cost receivers adapted for mobile users or users having successively various fixed locations.

The monitoring ground stations as described above, typically pertain to a satellite (or space) based navigation augmentation system (SBAS) in charge of determining the navigation correction data to be sent to the mobile users. Therefore the synchronous SBAS originated messages are framed and then multiplexed into a digital channel framed sufficiently often to be compatible with the broadcast capability offered by an auxiliary digital satellite system as will be described in further detail below.

Direct digital satellite broadcasting systems initially designed to broadcast digital radio, pictures or other relatively low-rate data now exist or are under development. These systems are able to process data directly coming from a number of up-link locations toward millions of low-cost receivers, whilst guaranteeing very low bit-error rates as needed to make transmission of video or music perceived as good-quality from a human point of view and have channel characteristics adapted to relatively low rate data, making the channel sufficiently cost-effective. Some of these systems do not require up-link data synchronization since their on-board processor have time-realignment capability, enabling transporting of synchronous data unaffected by satellite Doppler effect. For such systems, communication channels are usually controlled by associated signaling channels in which some room has been kept available for future use or auxiliary data. One example of such auxiliary data within signaling channel or commercial channel include low-rate data channel used to convey data similar to RDS (radio data system) data broadcast to conventional commercial audio receivers for cars as used in Europe.

Once the multiplexed augmentation data is broadcast in the down-link, mobile users under the coverage of the broadcasting satellite can then receive the data through a suitable and conventional digital receiver which in turn provides the received correction data to a frame retriever which is capable of de-multiplexing and retrieving said data and combine them with data received through to a conventional GNSS receiver.

Accordingly one object of the present invention is that of providing a system for augmentation of satellite positioning systems, comprising:

a satellite based augmentation system having at least one monitoring ground stations for determining a level of error of a satellite broadcasting positioning signals and at least one navigation computation center, said navigation computation center providing navigation correction data for transmission, and;

a digital satellite system using at least one digital satellite broadcasting multiplexed data in down-link transmission to a user station;

characterized in that at least one navigation computation center, is adapted for transmitting, directly or indirectly through intermediate equipment, said navigation correction data to said at least one digital satellite; and said user station has at least one satellite receiver connected to a down-link frame adapter for demultiplexing and retrieving said navigation correction data from said at least one digital satellite down-link transmission.

According to an aspect of the invention said navigation computation center is connected to an up-link frame adapter for framing said navigation correction data into a format and rate adapted for digital up-link transmission.

According to another aspect of the invention said multiplexed data is multiplexed on-board said digital satellite or on ground.

According to a further aspect of the invention said navigation correction data are contained in a fraction of a signaling channel associated to, or embedded within a communication channel of said down-link transmission, or in the communication channel itself; said signaling channel being characterized as it convey data needed to retrieve, synchronize, decode or process another channel, and that it contains at least one field reserved or assigned for transmission of auxiliary lower rate data which is somehow synchronized with data transmitted in other part of the communication channel.

Another object of the present invention is that of providing a down-link frame adapter according to the features of the present invention, being capable of converting data framing from said satellite down-link data channel rate to a format suitable for a conventional global navigational satellite system receiver or a software using global navigational satellite system data.

Another object of the present invention is that of providing a receiver having a down-link frame adapter incorporated therein.

Another object of the present invention is that of providing an up-link frame adapter according to the features of the present invention, being capable of converting correction data format from said navigation computer center to an up-link format adapted for said satellite system.

Another object of the present invention is that of providing a method for augmentation of satellite positioning systems, said system comprising:

- a satellite based augmentation system having at least one monitoring ground stations for determining a level of error of a satellite broadcasting positioning signals and at least one navigation computation center, said navigation computation center transmitting navigation correction data, and;
- a digital satellite system using at least one digital satellite for broadcasting multiplexed data in down-link transmission to a user station;

characterized in that said navigation correction data is transmitted by said at least one navigation computation center to said at least one digital satellite; and said user station demultiplexes and retrieves at least one of said navigation correction data from said at least one digital satellite down-link transmission by means of a down-link frame adapter connected to at least one satellite receiver.

These and further advantages of the present invention are explained in more detail in the following description as well as in the claims with the aid of the accompanying drawings.

EXAMPLES OF PREFERRED EMBODIMENTS

As it has been discussed further above, monitoring ground stations may be used in order to monitor positioning signals broadcast by a positioning satellite constellation. The data obtained as a result of said monitoring of the broadcast signal is then compared to the exact data related to the position of the monitoring ground station itself, which is already available. Based on said comparison and on the quality of the signal observed, correction information is generated by a computation center associated to said monitoring ground station. The navigation correction information is then provided to the mobile users under the area of coverage of said positioning satellite constellation so as to overcome possible inaccuracies in determining the exact position of said mobile users, and giving factual information about the degree of reliability and confidence into such data.

According to the solution provided by the present invention, said navigation correction data is provided to the mobile users by using the capability of a digital satellite system, such as the direct digital satellite broadcasting systems (DDBS), in broadcasting directly towards said mobile users using a specific frame adapter for receiving multiplexed data, de-multiplexing and retrieving useful information related to the correction information.

Figure 1:
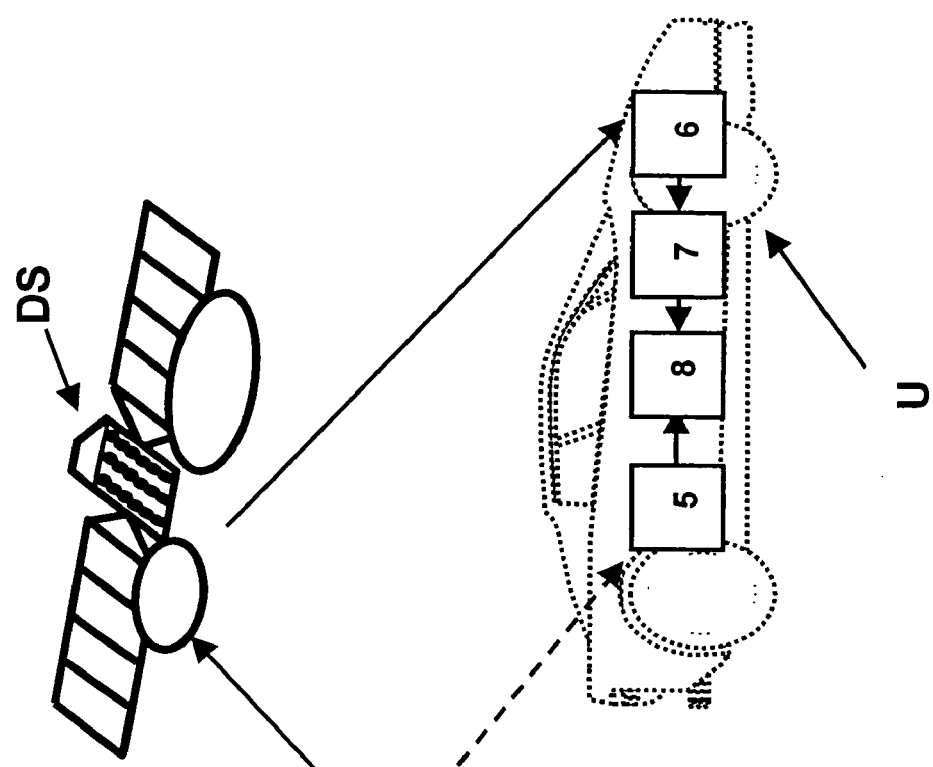
FIG. 1 is a schematic diagram representing the main features of the present invention.

In FIG. 1, a schematic diagram is shown representing, inter alia, a satellite NS from a navigational positioning satellite constellation, such as a GNSS. As it has been mentioned above, in practice more than one satellite is used for a typical positioning application. Nevertheless for the sake of simplification, only one satellite NS is shown, being understood that the description herewith provided is by analogy applicable to the rest of the satellites used for the same positioning application.

Referring back to FIG. 1, said satellite NS broadcasts navigational signals to mobile users U which are under its area of coverage. In the figure, the signal broadcast by the navigational satellite is shown with a discontinuous arrow which is received by a conventional receiver 5 suitable for receiving GNSS type signals.

The same signals are also received at a monitoring ground station MGS which, as mentioned above, is in charge of monitoring the data broadcast from the navigational satellite NS. The data is thus received at a receiver unit 1 of conventional type and is then passed to a computation center 2 which may or may not be located at the same site as the monitoring ground station MGS, wherein the received positioning data is compared to a set of exact data related to the position of one or more of the monitoring ground stations MGS, said data being already available by means of precise determination of the position of the respective MGS.

The computation center 2, using pseudo-range measurement received by the monitoring ground station MGS, generates a set of correction parameters which are useful for the users under the coverage of the navigational satellite NS for correcting the data they receive related to their respective positions. It may occur in practice that one computation center 2 is located at the same site of each monitoring ground station MGS or at the site of some of them; or that several computation centers 2 perform the same computation relative to a monitoring ground station MGS in parallel. The invention enables to simultaneously broadcast such navigation correction data such that the user can determine which one is the best to use.

The correction data obtained is then sent from the computation center 2 to a frame adapter 3 wherein the format of the data output from the computation center 2 is converted into a format suitable for an up-link digital transmission. The converted data is then fed into a conventional digital up-link transmission station 4, where it possibly shares a channel with data of different nature. The digital up-link transmission station 4 may optionally have the capability to multiplex the data before it is transmitted in the up-link. Said station 4, thus transmits the signal in the up-link to a satellite DS which is capable of either multiplexing it into a digital channel framed in a suitable manner for down-link broadcast of the same or simply re-transmit the multiplexed data prepared at the digital up-link transmission station 4. One example of such satellite systems is using on-board processing of signals as a direct digital broadcasting system such as an audio broadcasting system already described further above.

A processing method for such on-board multiplexing of data (21) is known from U.S. Pat. No. 6,201,798 assigned to WorldSpace Management Corporation. Nevertheless the invention is not to be understood to be limited to the use of said method and other known methods may equally be applied for on-board multiplexing as well as for combining of multi-source data, including when multiplexing is provided by navigation satellites themselves, or when the satellite re-transmits data channel multiplexes already multiplexed on ground.

The multiplexing of all up-link data into down-link channels is preferably done using TDM mode, tagged so as to identify which satellite on-board processor/down-link multiplex combination is in use, and optionally spread over the down-link spectrum.

On the mobile user side U, the down-link multiplexed signal is received by a conventional digital receiver 6 suitable for receiving such type of signals. The data is then passed to frame retriever 7 which is in charge of de-multiplexing and retrieving the data related to the navigation correction of the positioning information as determined at one or more of the computation center(s) 2. The navigation correction information is then provided to the correction unit 8 of the mobile user U. On the other hand, the positioning data from the navigation satellite NS is also received by the digital receiver 5 and is provided to the correction unit 8 wherein navigation correction parameters are applied to the data received from the navigation satellite NS, thus enabling a higher precision, availability, continuity and integrity of data to be obtained on the positioning data of the mobile user U.

As it has been already mentioned, the navigation correction data are contained in a fraction of a signaling channel associated to a communication channel of said down-link transmission. Alternatively, said navigation correction data may be allocated in the communication channel itself, in which case it would occupy a fraction of the channel.

Alternatively, the navigation correction data are transmitted from said navigation computation center to said up-link frame adapter through a satellite link using data characterized as formatted according to a standard format applicable to transmission from geo-stationary satellites to aircraft such as for example the DO-229 RTCA standard or the like.

Optionally, the navigation correction data are computed at several computation centers and transmitted simultaneously to a user station. The user station may then choose to select a specific navigation correction data received from one of said computation centers or alternatively combine data received from several of said computation centers.

For the purpose of the present invention, a user station may be mobile or otherwise be placed successively at various locations, although the mobile station may be permanently assigned to a fix position; as this does not impact the present invention, no further reference to the fix position capability is considered necessary.

According to the solution provided by the invention it is also possible that the up-link frame adapter 3 extracts from the data transmitted thereto by the navigation computation center, information related to the time. In such case, the data related to the time computed for a specific point, characterized by its latitude (LAT), longitude (LONG) and altitude (ALT)—as per the reference datum used by the global navigation system—is replicated and inserted into a specific portion of the said signaling channel. Optionally, the down-link frame adapter is also capable of extracting and replicating other specific data such as, for example, GNSS almanacs from navigation data transmitted by the navigation computation center and insert them into a dedicated portion of said signaling channel.

Likewise, the down-link frame adapter 7 is also capable of extracting date related to time as specified above in relation to the up-link frame adapter and provide said time data to the user station U or to display it on a display panel. Optionally, said down-link frame adapter 7 is also capable of extracting specific data, such as, for example, GNSS almanacs from a specific portion of the said signaling channel, an provide said specific data to the user station U to aid GNSS satellite acquisition or tracking.

Optionally the down-link frame adapter is the user receiver 6 itself, thus the process of demultiplexing and retrieving data—including time—is performed in the receiver unit.

It is to be noted that the level of accuracy of the time information given to a down-link frame adapter 7, a receiver 6 located at a first location, say M (not shown in the figures), or a user correction unit 8 may be enhanced by transmitting part or all of the information enabling to determine the position of a second pre-determined location, say A, such as, for example, its latitude (LAT), longitude (LONG) and altitude (ALT), as per the reference datum used by the global navigation systems, and then compensating a timing difference with the time data related to the user correction unit 8 at location M by algebraic addition of propagation time differences between the satellite and the location M as compared to the satellite and location A. The time difference may be estimated, entered or computed by any method known in the related art, with an accuracy depending upon the required accuracy for the time at location M.

The information related to time may optionally be transmitted in a format suitable for reception by the receiver 6 and be used for triggering transmission of information or for displaying information to a user.

Figure 2:
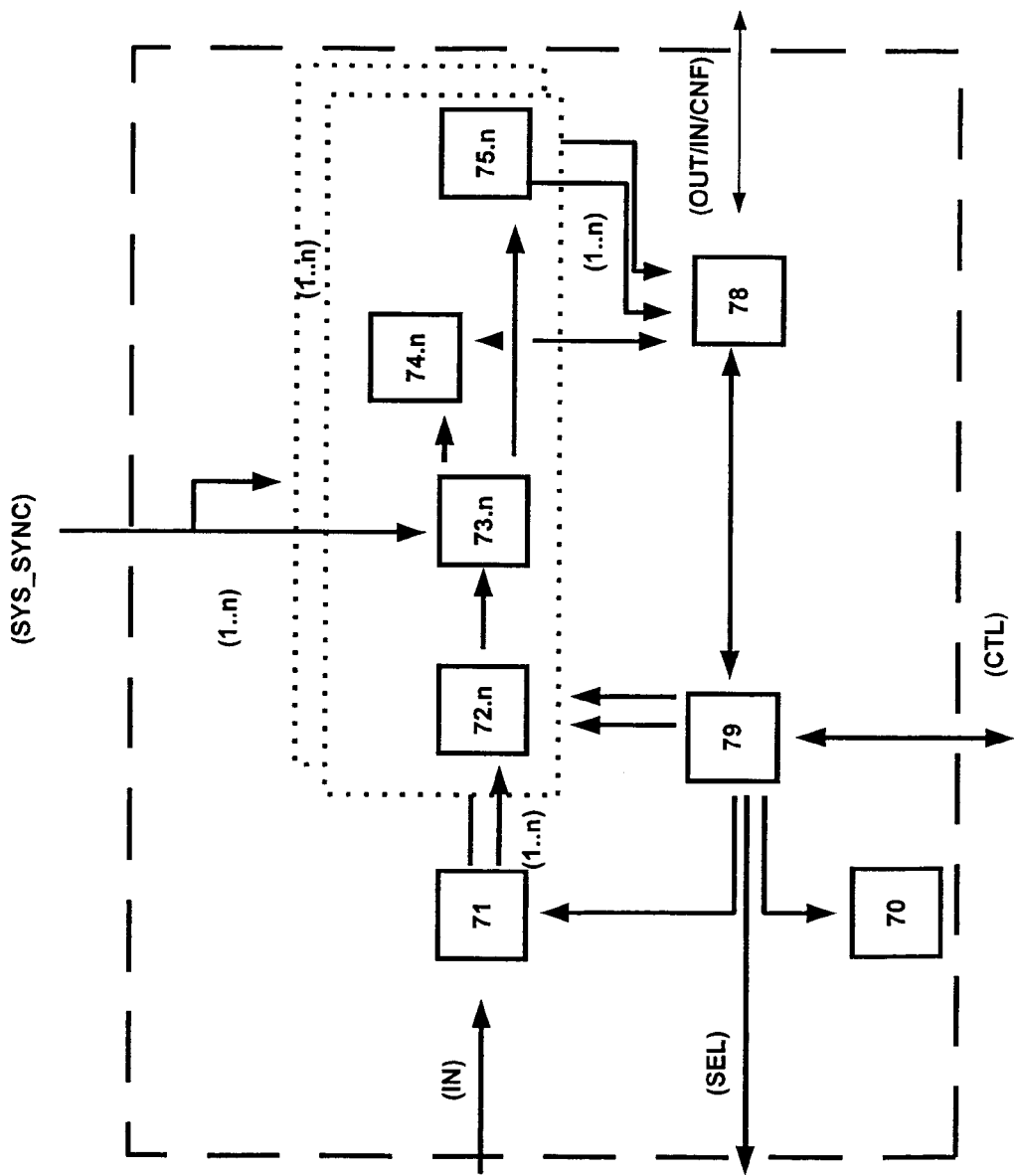
FIG. 2 is a block diagram of a down-link frame adapter used by a mobile user in order to be connected to a conventional down-link receiver compatible with the above mentioned system.

FIG. 2 shows a block diagram representing an example of a frame retriever 7 in more detail. In said figure, input IN is for connection to a conventional DDBS digital receiver 6 and a correction unit 8 can be connected at a separate port referenced as IN/OUT/CNF. The frame retriever 7 preferably has a front-panel keyboard and a port CTL to a conventional video terminal unit for default setting and debugging. In this manner the correction unit 8 thus can load station/channels/sub-channels configuration table(s) into a down-link frame adapter management processor 79 preferably through a down-link frame adapter protocol manager 78 and preferably using IP connection suite. The processor 79 can then send selection data SEL to the receiver 6 should a specific selection from the data contained in the received down-link signal be required, and is such case, preferably also to a front-panel display 70.

A channel synchronizer 71 can recognize and extract useful data coming from the computation center 2 from channel data, using preferably framing embodied into channel signaling data originated at the up-link station 4 and/or frame markers set by a satellite processor on-board the digital satellite DS. Depending upon the configuration of the system and the number of processor centers 2 as driven by processor 79, the channel synchronizer 71 can set one or more (1 . . . n) sub-channel synchronizers 72.$n$ to be associated to one individual unit of computer centers should this be needed. Data received from receiver 6 are related to one DS channel as extracted from said DS satellite down-link multiplex.

The sub-channel synchronizer 72.$n$, recognizes and extracts navigation correction data related to frames from channel data, and provides them to a de-framing/re-framing synchronizer, frame and rate converter 73.$n$, which may be a simple buffer in the case the computer center uses the same framing features than the broadcasting system and the receivers 6. In case framing and/or message rate is to be adapted to a system external synchronization signal provided at an input SYS_SYNC such as for instance GPS time, the synchronizer 73.$n$ buffers the data frames as appropriate and converts rates to deliver them in due time or at due rate as data messages. Otherwise the synchronizer 73.$n$ uses internally generated timing signal, derived preferably from DDBS channel time marker data.

The special message data detector 74.$n$ recognizes special messages such as time data, GNSS almanacs from message fields originating from a remote up-link frame adapter 3 through the satellite transmission, and sends them to the frame adapter processor 79 through a protocol driver 78 for display on front-panel 70. The loop data detector 74.$n$ may also pass those messages originating from protocol driver 78 and make them available to the output port OUT. The processor 79 can set a list of special messages fields for the detector 74.*n* to enable it to react accordingly.

Messages may be internally stored and/or uncompressed by a message sequencer 75.*n*, to be delivered as logical uninterrupted suites of messages should this be required by application, and then delivered to the protocol frame adapter 78. Optionally the message sequence 75.*n* can re-format according to standard in use by the mobile unit U, such as the DO-229 for instance. Also frame retriever can be realized as a specific software running on computation unit 8.

Figure 3:
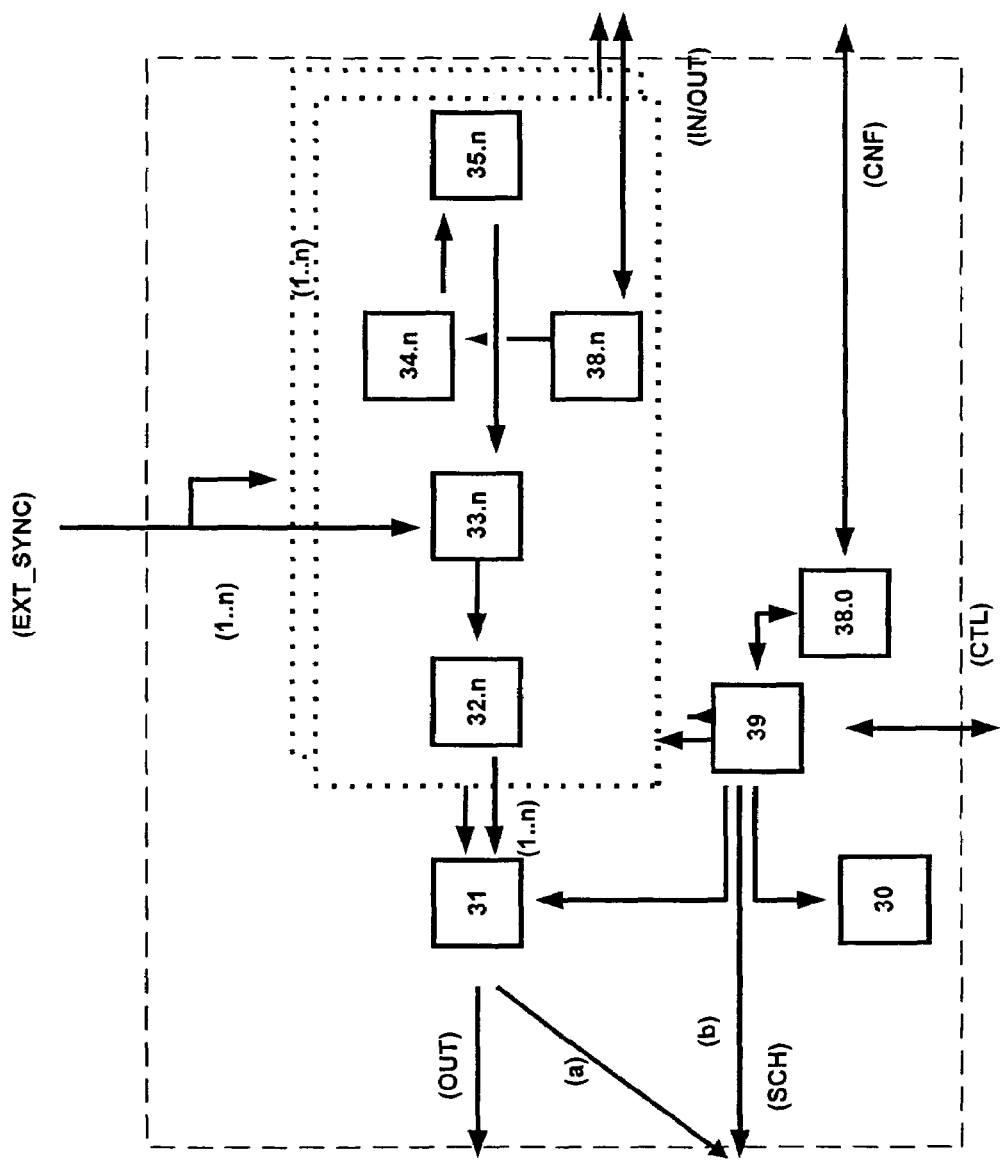
FIG. 3 is a block diagram of an up-link frame adapter used by a navigation computing center in order to be connected to a digital up-link station compatible with the above mentioned system.

FIG. 3 shows a block diagram representing an example of an up-link frame adapter 3 in more detail. It is readily appreciated from the figure that the general structure of this adapter is substantially derived from that of a down-link frame adapter as shown in FIG. 2, although individual sub-channels have their dedicated input. In FIG. 3, the input OUT/IN of the frame adapter 3 is connected to a computation center 2, whilst a broadcast station 4 is connected at the output port OUT. The frame adapter 3 preferably has a front-panel keyboard and a port CTL to a conventional video terminal unit for default setting and debug. The computation center 2 thus can load station/channels/sub-channels configuration table(s) into an up-link frame adapter management processor 39 through a main up-link frame adapter protocol manager 38, preferably using IP connection suite. The processor 39 can then feed the broadcast station 4 sub-channel header data through its control port SCH using channel/sub-channel arrangement information according to configuration set within the adapter and consistent with the one used by the down-link frame adapter, through a path labeled b on FIG. 2, or preferably through a path labeled a through channel assembler 31 depending upon setting. Each chain of computer center 2 is connected to one of the OUT/IN port(s) through an associated protocol manager 38.*n*.

Messages suites may internally be stored, stripped from unnecessary forward error transmission related bits that may have been needed according to a communication standard such as DO-229, or as needed to protect the computation center 2 to up-link adapter 3 application-level link, split by message splitter 35.*n*, according to need, thus transmitted to the rate and frame converter 33.*n*. Special data formatter 34.*n* may also recognize specific messages such as time data, or GNSS satellite almanacs along the flow originating from protocol driver 38 and perform the necessary copies, re-formatting and computations before being transmitted to message sequencer 35.*n*. Messages may be internally buffered and/or compressed by a message sequencer 35.*n* to be delivered as logical uninterrupted suites of messages should this be required by application, and then delivered to frame/rate adapter 33.*n*. Frame/rate adapter buffers the data frames as appropriate and converts rates to deliver them in due time or at due rate as data messages according to up-link need to sub-channel formatter 32.*n*. Sub-channels flows are grouped together by channel assembler 31 and delivered, according to setting made by processor 39, either to data output OUT or to signaling control output SCH through the path shown as a), in which case path b is not used. The outputs OUT and SCH are connected to respective inputs of the up-link station 4.

Therefore, the solution provided by the present invention has the advantage of eliminating the need for use of dedicated transponders on-board the satellite, thereby reducing cost and optimizing the payload capacity of the satellite.

Further advantages of the solution provided by the present invention are as follows:

sharing data transmission resources in the whole system;

use of a low cost channel which may be even free of cost if the data could be arranged for transmission on existing cooperative channels or inside part usually left free in signaling channels;

possibility to increase redundancy without increasing the number of dedicated satellites;

possibility for a user to simultaneously receive several navigation corrections computed in parallel and chose the best one(s).

enhancing availability in urban environment or frequency polluted environment by using frequency diversity.

enhance original direct digital broadcasting system service capability by feeding it with fairly accurate time for general broadcast reducing time required to acquire GNSS satellite constellation by providing GNSS almanacs faster.

The invention claimed is:

1. A system for augmentation of satellite positioning systems, comprising:

a satellite based augmentation system having at least one monitoring ground stations (MGS) for determining a level of error of a satellite (NS) broadcasting positioning signals and at least one navigation computation center (2), said navigation computation center (2) providing navigation correction data for transmission, and;

a digital satellite system using at least one digital satellite (DS) broadcasting multiplexed data in down-link transmission to a user station (U);

characterized in that at least one navigation computation center (2), is adapted for transmitting, directly or indirectly through intermediate equipment, said navigation correction data to said at least one digital satellite (DS); and said user station (U) has at least one satellite receiver (6), receiving directly or indirectly through any kind of retransmission said digital satellite signal, and being connected to at least one down-link frame adapter (7) for demultiplexing and retrieving said navigation correction data from said at least one digital satellite down-link transmission.

2. A system according to claim 1, wherein at least one of said navigation computation center (2) is connected to an up-link frame adapter (3) for framing said navigation correction data into a format and rate adapted for digital up-link transmission through said digital satellite (DS).

3. A system according to claim 1, wherein said multiplexed data is multiplexed on-board said digital satellite (DS) or on ground, and protected with a system transmission forward error correction mechanism compatible with said digital satellite (DS) and receiver (6).

4. A system according to claim 1, wherein said navigation correction data are contained in a fraction of a signaling channel associated to or embedded within a communication channel of said down-link transmission, or located in a fraction of the communication channel itself.

5. A system according to claim 4, wherein said signaling channel is adapted for conveying data needed for retrieving, synchronizing, decoding or processing a communication channel in a system using said digital satellite (DS), and wherein it further contains at least one field reserved or assigned for transmission of auxiliary lower rate data capable of being synchronized with data or data frames transmitted in other parts of said communication channel.

6. A system according to claim 1, wherein said navigation correction data are transmitted from at least one of said navigation computation center (2) to said up-link frame adapter (3) through a satellite link.

7. A system according to claim 1, wherein a user station (U) is adapted for receiving navigation correction data from a plurality of navigation computation centers (2), and is capable of selecting navigation correction data transmitted from one of said navigation computation centers (2) or combine data received from more than one of said navigation computation centers (2).

8. A system according to claim 1, wherein said user station (U) is mobile or can be placed successively at various locations.

9. A system according to claim 2, wherein said up-link frame adapter (3) is adapted for extracting, from correction navigation data transmitted by said navigation computation center (2), specific data and allocate said data as computed for a specific point into a specific portion of the said signaling channel.

10. A system according to claim 1, wherein said down-link frame adapter (7) is adapted for extracting from said satellite down-link transmission data related to specific data from a specific portion of said signaling channel.

11. A system according to claim 1, where said down-link frame adapter is incorporated in a correction unit (8) or in a receiver (6) of said user station (U).

12. A down-link frame adapter (7) for use in a system for augmentation of satellite positioning systems, said system comprising: a satellite based augmentation system having at least one monitoring ground station (MGS) for determining a level of error of a satellite (NS) broadcasting positioning signal and at least one navigation computation center (2), said navigation computation center (2) providing navigation correction data for transmission; and a digital satellite system using at least one digital satellite (DS) broadcasting multiplexed data in down-link transmission to a user station (U); wherein at least one navigation computation center (2), is adapted for transmitting, directly or indirectly through intermediate equipment, said navigation correction data to said at least one digital satellite (DS); and said user station (U) has at least one satellite receiver (6), receiving directly or indirectly through any kind of retransmission said digital satellite signal, said down-link frame adapter being connected to said user station for demultiplexing and retrieving said navigation correction data from said at least one digital satellite down-link transmission.

13. A down-link frame adapter according to claim 12, wherein it is capable of converting data framing from said satellite down-link data channel rate to a format suitable for a conventional global navigational satellite system receiver or a software using global navigational satellite system data.

14. A receiver (6) for use in a system for augmentation of satellite positioning systems, said system comprising: a satellite based augmentation system having at least one monitoring ground station (MGS) for determining a level of error of a satellite (NS) broadcasting positioning signal and at least one navigation computation center (2), said navigation computation center (2) providing navigation correction data for transmission; and a digital satellite system using at least one digital satellite (DS) broadcasting multiplexed data in down-link transmission to a user station (U); wherein at least one navigation computation center (2), is adapted for transmitting, directly or indirectly through intermediate equipment, said navigation correction data to said at least one digital satellite (DS); said receiver being located at said user station (U) and receiving directly or indirectly through any kind of retransmission said digital satellite signal, said user station being connected to a down-link frame adapter for demultiplexing and retrieving said navigation correction data from said at least one digital satellite down-link transmission, said down-link frame adapter (7) being adapted for extracting from said satellite down-link transmission data related to specific data from a specific portion of said signaling channel.

15. An up-link frame adapter for use in a system for augmentation of satellite positioning systems, said system comprising: a satellite based augmentation system having at least one monitoring ground station for determining a level of error of a satellite broadcasting positioning signal and at least one navigation computation center, said navigation computation center providing navigation correction data for transmission; and a digital satellite system using at least one digital satellite broadcasting multiplexed data in down-link transmission to a user station; wherein at least one navigation computation center, is adapted for transmitting, directly or indirectly through intermediate equipment, said navigation correction data to said at least one digital satellite; and said user station has at least one satellite receiver, receiving directly or indirectly through any kind of retransmission said digital satellite signal, said user station being connected to a down-link frame adapter for demultiplexing and retrieving said navigation correction data from said at least one digital satellite down-link transmission, wherein said uplink frame adapter is connected to said navigation computation center for framing said navigation correction data into a format and rate adapted for digital up-link transmission through said digital satellite.

16. An up-link frame adapter according to claim 15, wherein it is capable of converting correction data format from said navigation computer center to an up-link format adapted for said digital satellite system.

17. A method for augmentation of satellite positioning systems, said system comprising:
 a satellite based augmentation system having at least one monitoring ground stations (MGS) for determining a level of error of a satellite (NS) broadcasting positioning signals and at least one navigation computation center (2), said one navigation computation center (2) transmitting navigation correction data, and;
 a digital satellite system using at least one digital satellite (DS) for broadcasting multiplexed data in down-link transmission to a user station (U);
 characterized in that said navigation correction data is transmitted by said at least one navigation computation center (2) to said at least one digital satellite (DS); and said user station (U) de-multiplexes and retrieves at least one of said navigation correction data from said at least one digital satellite down-link transmission by means of a down-link frame adapter (7) connected to at least one satellite receiver (6).

18. A method according to claim 17, wherein said navigation correction data are stripped from forward error correction related bits, framed by a frame adapter (3) receiving data from said navigation computation center (2), into a frame format and rate adapted for digital up-link transmission.

19. A method according to claim 18, wherein specific data recognized from said navigation correction data are replicated, re-formatted and inserted into at least one specific field of said signaling channel of said digital satellite (DS) system.

20. A method, according to claim 17, wherein data related to time is broadcast to the user, said time being the time evaluated in relation to a specific point characterized by its latitude, longitude and altitude, as per a reference datum used by a global navigation system.

21. A method, according to claim 18, wherein:
 a first time information is provided to the down-link frame adapter (7), to the receiver (6) located at a first location, or a correction unit (8) of a user station (U);

partial or complete information on a second, pre-determined location is transmitted to the user station (U) enabling to determine said second point positioning parameters such as, latitude, longitude and altitude thereof, as per a reference datum used in a global navigation system; and a compensating time difference is calculated for the correction unit (8) by algebraic addition of propagation time difference between a satellite and said first location as compared to that of said satellite and said second location.

22. A method, according to claim 18, wherein data related to time is transmitted in a format suitable for a conventional receiver (6) for a digital direct broadcasting satellite system and is used for triggering transmission of information or for displaying information to a user.

23. A method according to claim 18, wherein GNSS almanacs are transmitted in parallel to other navigation correction data through said specific fields of said signaling channel of said digital satellite system.

* * * * *